Fig. 4
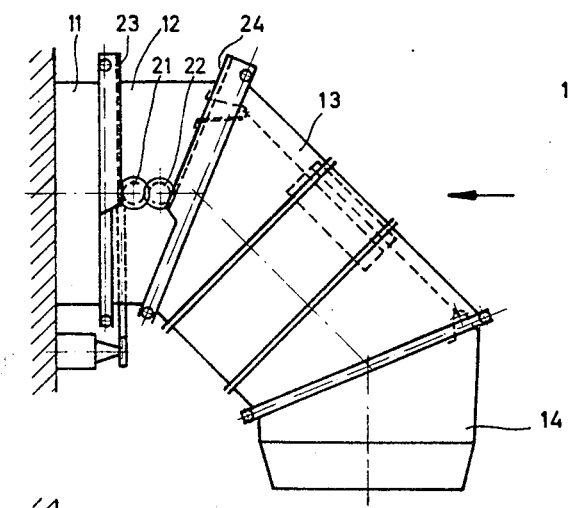
Fig. 6
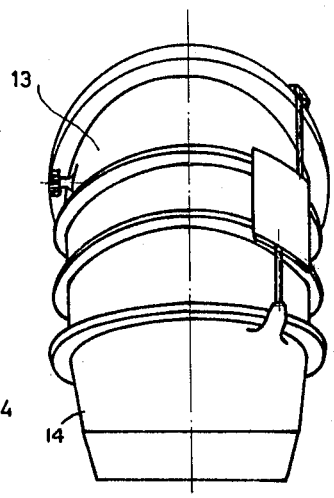
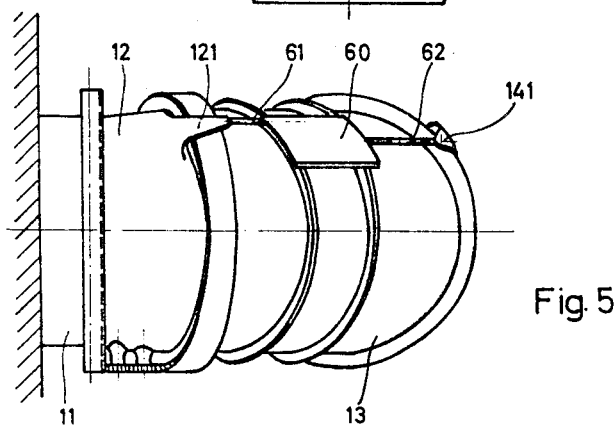
Fig. 5

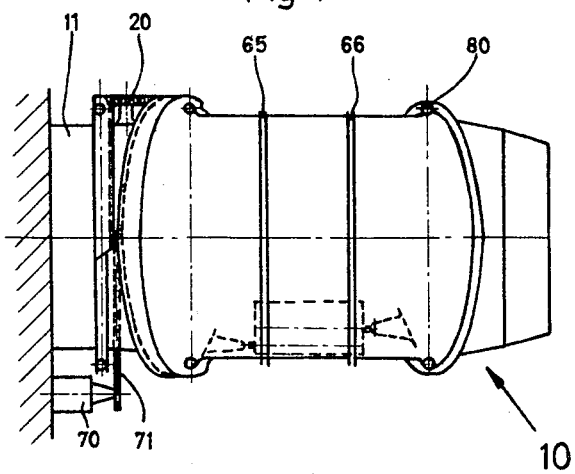
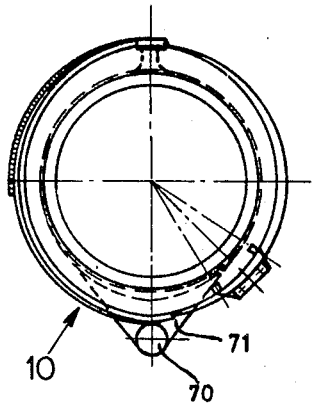
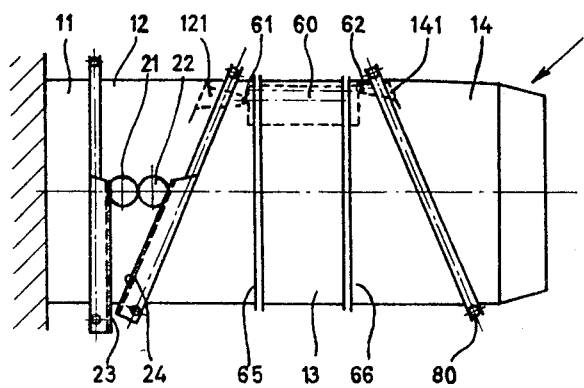

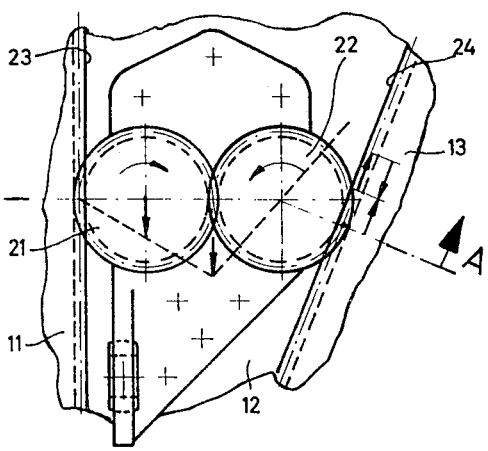
Fig. 7
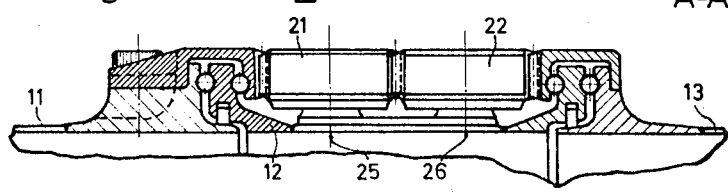
Fig. 8  A-A
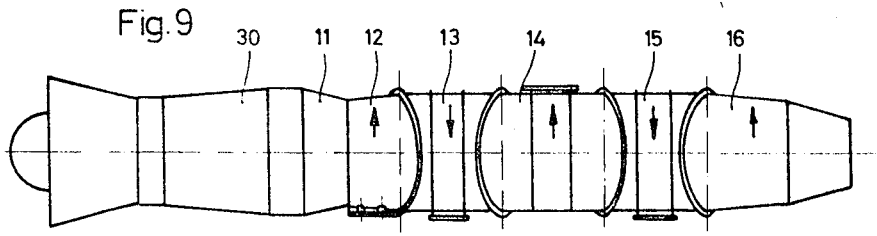
Fig. 9
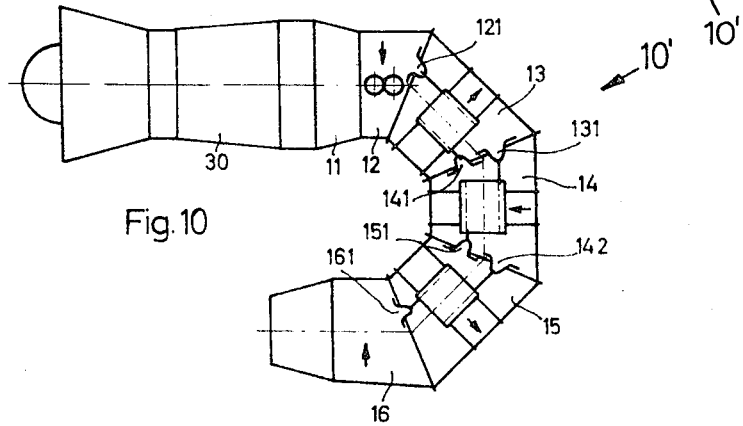
Fig. 10
INVENTORS
GERHARD KOPP
GERO OTTO MADELUNG
ATTORNEYS

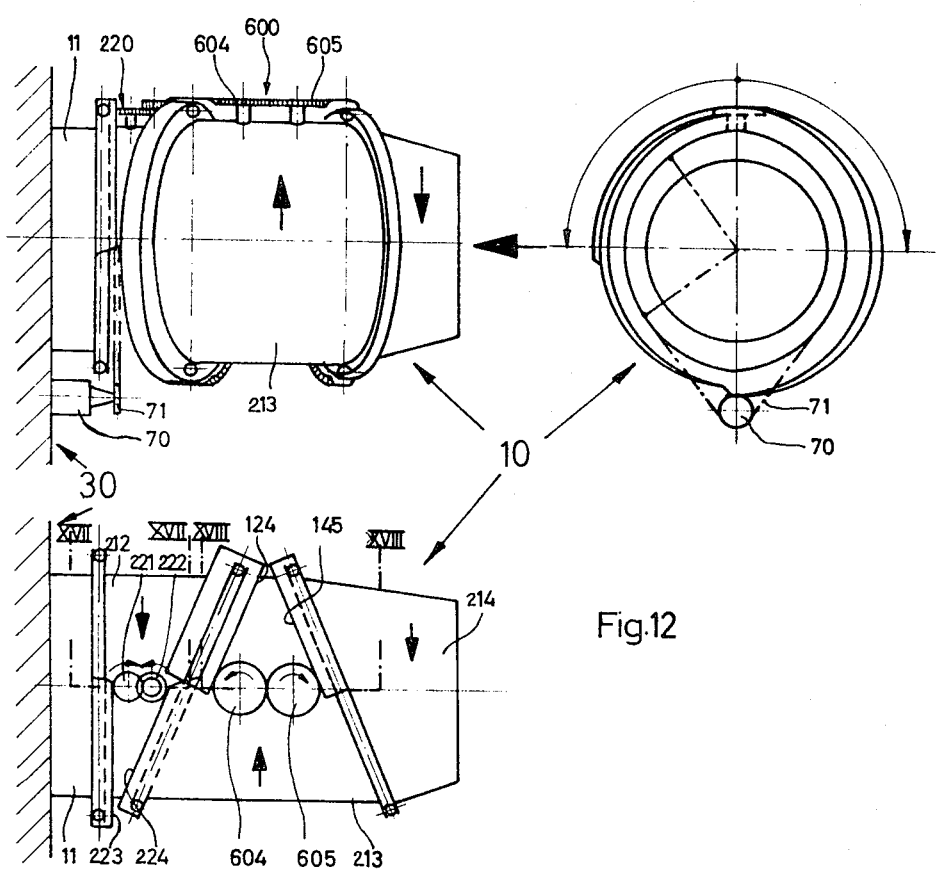

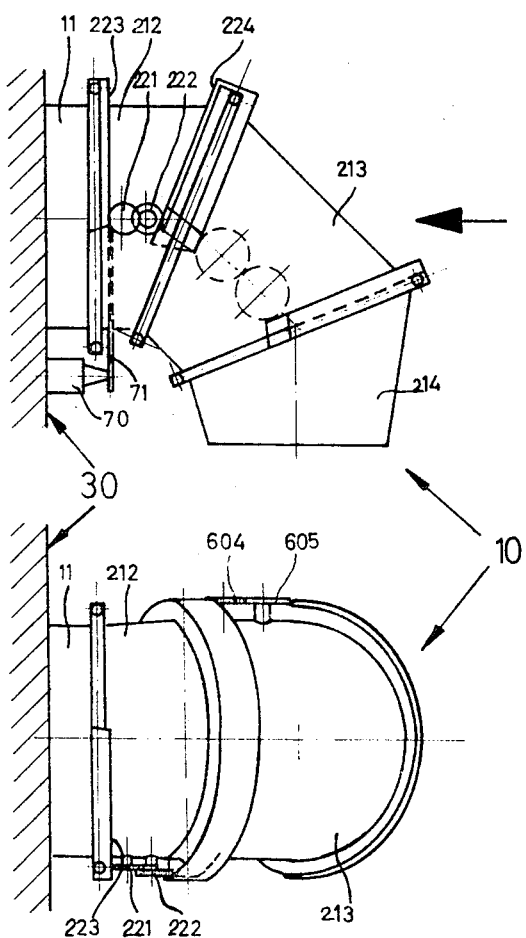
Fig.14
Fig.15
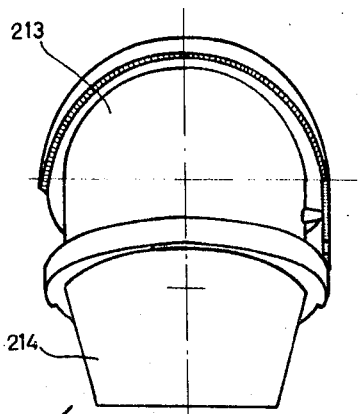
Fig.16

United States Patent Office 3,443,758
Patented May 13, 1969

3,443,758
SWIVELABLE JET NOZZLE, INTENDED ESPECIALLY FOR VERTICAL TAKE-OFF AND SHORT TAKE-OFF PLANES
Gerhard Kopp and Gero Otto Madelung, Munich, Germany, assignors to Entwicklungsring Sud G.m.b.H., Munich, Germany, a corporation of Germany
Filed Oct. 13, 1966, Ser. No. 586,497
Claims priority, application Germany, Oct. 29, 1965, E 30,384; Nov. 16, 1965, E 30,478
Int. Cl. B64c *15/08;* F02k *1/24;* F16l *27/08*
U.S. Cl. 239—265.35                    10 Claims

ABSTRACT OF THE DISCLOSURE

The disclosure relates to a swivelable exhaust nozzle for jet airplanes having a plurality of tubular sections. The first section is secured to the airplane propulsion unit and each succeeding section is rotatable about its axis and rotatably connected to its adjacent sections in such a way that the axes of all sections remains in a single plane of symmetry at all times.

---

The invention herein relates to swivelling jet nozzles, intended particularly for vertical take-off and short take-off planes, having a plurality of tubular sections, which in relation to the system axes have oblique connection planes, making it possible to obtain reciprocal revolving movement of the individual tube sections in relation to a vertical plane of symmetry without introducing lateral deflections upon a reversal of thrust.

The drive of such swivelling nozzles must be such that upon turning the individual tube sectors the system-lines of the sections will remain in one and the same plane of symmetry. This is particularly important to prevent undesirable yawing moments. Examples of the prior art are seen in British Patent 743,874 and U. S. Patent 2,933,891.

An object herein is a swivelling drive for the jet nozzles which will meet all operating requirements over a continuous operation, and at the highest temperatures. Additionally, uniform opposing revolving movement of the individual tube sections is obtained.

Uniformity, when the system includes a chain of sections, may only be assured if play has been eliminated during transmission and thrust is maintained in the vertical plane of symmetry of the tube sections, this being particularly so when a chain of sections is required and wherein a succeeding section must revolve at the same speed as one from which it is driven.

Herein play is eliminated by mounting the intermeshing follower drive mechanism on the tubular section intermediate the sections to which the mechanism is connected for driving and driven purposes. In one embodiment, a follower is mounted on the intermediate section with connectors extending to the preceding and succeeding sections, the connectors intermesh by being slidably received within the follower. In a second embodiment, intermeshing gears are carried on the intermediate section and one meshes with a rack on the preceding section and the other with a rack on the succeeding sections. Both embodiments provide, in effect, a continuous positive drive mechanism having relatively short drive arms, with the drive maintained across a line parallel to the system axis, thus eliminating play, yawing, and maintaining uniformity.

The tube sections, for practical reasons, have an elliptical cross-section, but as is well known are developed with circular ends for the pivot bearings thereof and, when viewed along an axis at right angles to the oblique end plane, the major axis of the ellipse corresponds to the diameter of the circularly developed pivot bearing and the minor axis is that at right angles thereto across the oblique plane.

It will hereinafter be seen that the stresses on the followers are reduced by relatively simple means, and the play of the followers reduced to a minimum because of the fact that through a decrease of the distance between the pivot bearings, length is reduced. Since fewer constructional elements are necessary, the weight decreases correspondingly. In the case of the followers of the first embodiment, the distance between points of drive for the followers changes during the operation, whereas in the second, the followers are provided which keep the drive points constant in every position. This latter is achieved by a gear system follower which reverses the rotational direction of the tube section which has been added subsequent to the tube section carrying the gear mechanism, as related to the rotational direction of the tube section carrying the gear mechanism.

The invention will be fully understood from the description herein, read in light of the accompanying drawings wherein:

FIGURE 1 shows a side view of swivelling jet nozzle in the position where it is not swung out and incorporating one embodiment of the invention;

FIGURE 2 shows a plan view of a jet nozzle corresponding to FIGURE 1;

FIGURE 3 shows a jet nozzle according to FIGURE 1, seen from the direction of the arrow therebetween;

FIGURE 4 shows a side view of the jet nozzle corresponding to FIGURE 1, but swung out by 90°;

FIGURE 5 shows a plan view of a jet nozzle corresponding to FIGURE 4;

FIGURE 6 shows a jet nozzle corresponding to FIGURE 4 seen from the direction of the arrow therebetween;

FIGURE 7 shows the gear mechanism disclosed herein, on an enlarged scale and in plan view;

FIGURE 8 shows a section on the line A—A of FIGURE 7;

FIGURE 9 shows a diagrammatic presentation of a jet nozzle with a multiplicity of tube sections, in the position where it is not swung out, and viewed from above;

FIGURE 10 shows a jet nozzle corresponding to FIGURE 9, viewed from the side and in such a swung out position that a thrust reversal of approximately 180° is possible;

FIGURE 11 shows a side view of a swivellable jet nozzle in the position where it is not swung out, viewed from the side and incorporating the second embodiment of the invention;

FIGURE 12 is a top view of the jet nozzle shown in FIGURE 11;

FIGURE 13 is the jet nozzle shown in FIGURE 11, viewed from the direction of the arrow therebetween;

FIGURE 14 is a side view of the jet nozzle shown in FIGURE 11, swung out by 90°;

FIGURE 15 is a top view of the jet nozzle shown in FIGURE 14, viewed from the direction of the arrow therebetween;

FIGURE 16 is a view of the jet nozzle shown in FIGURE 14; viewed from the direction of the arrow therebetween;

Figure 17:
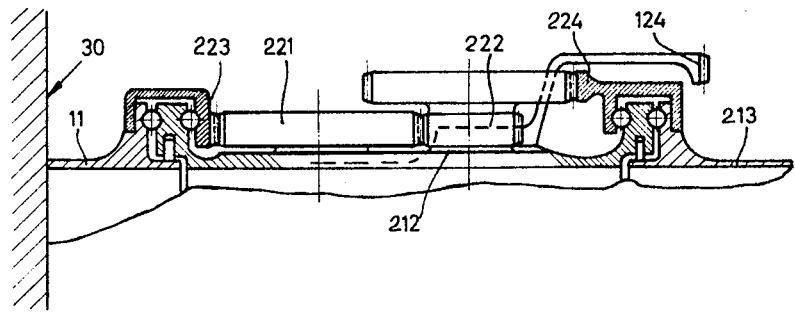
FIGURE 17 is a section on the line XVII—XVII of FIGURE 12 on an enlarged scale.
Figure 18:
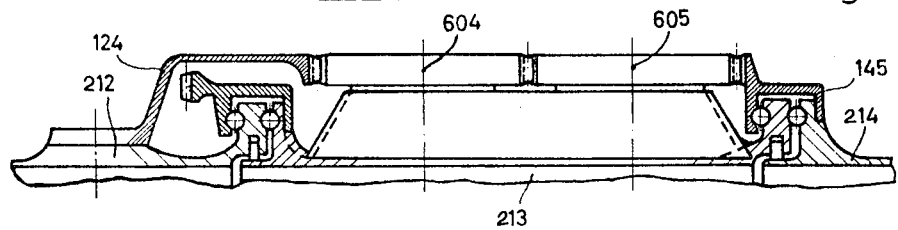
FIGURE 18 is a gear mechanism on an enlarged scale and in cross-section on the line XVIII—XVIII of FIGURE 12.

The thrust tubes in the figures are designated generally at 10 when three rotating sections are used and as 10' when a chain is used. The tube sections are designated 11 through 16 in the first embodiment (FIGURES 1 to 10) and 212 through 216 in the second embodiment (FIGS. 11 to 20). The section 11 in each instance is fixed to the propulsion unit 30.

Referring to the first embodiment, rotation of section 13 relative to section 11 is provided through the intermeshing follower drive mechanism 20 which is mounted on the section 12 with the pivot axis of the gears perpendicular to the system axis. Gear 21 (see FIG. 7) engages a rack or toothed segment 23 secured to section 11 and gear 22 engages a rack or toothed segment 26 secured to section 13.

To obtain rotation, section 12 is driven by a motor 70 through a chain drive, or by any similar means. Thus, as section 12 rotates, gears 21 and 22 cause rotation of section 13 at the same but opposite speed as section 12; the gears 21 and 22 and associated rack thus provide an intermeshing follower drive mechanism from sections 11 to 13.

Rotation of tube section 14 is accomplished through carrying on tube 13 a substantially rectangular carriage 60, movably mounted in parallel peripherally extending U-shaped rails 65 and 66 in any suitable manner. Longitudinally slidable in carriage 60 are a pair of connectors 61 and 62, the outer end of connector 61 being secured for articulating movement to bracket 121 on tube section 12; and the outer end of connector 62 being similarly connected to bracket 141 on tube section 14.

Thus, upon rotation of tube 12, torque is passed to tube 14 through the connectors 61, 62 reciprocally intermeshing with the carriage 60, which being contained by the parallel connectors travels on the rails, and as the rods are parallel to the system axis, the center of carriage 60 is perpendicular thereto. Obviously, more than one follower mechanism can be used if greater transfers of torque are demanded.

It is thus seen that torque is transmitted from a first section 11 to second section 13 spaced by an intermediate section 12 which carries the intermeshing follower drive mechanism 20 having operable connections to the first and second sections 11 and 13. In like manner, section 12 becomes a first section and section 14 a second section spaced by an intermediate section 13. Intermediate section 13 now carries the intermeshing follower drive mechanism having operable connections to the first section 12 and second section 14. This sequence follows for the chain hereinafter described and for both embodiments.

As can be seen from FIGURES 1 to 6, it is possible to achieve varying degrees of thrust deflection reversal within the range of 0° to 90° by rotation of the tube sections 11, 12, 13 and 14. If reversal of the thrust is desired, that is through 180°, additional tube sections and followers may be used, as shown in FIGURES 9 and 10. Therein, the tube sections 12 and 14 are connected by elements 121, 60 and 141 (as in FIG. 1), the tube sections 13 and 15 are connected by elements 131, 60 and 151, and the tube sections 14 and 16 are connected by elements 142, 60 and 161, in such a manner that the torques are transmitted in such manner that the resulting thrust always remains vertical to the plane of symmetry of the tube section, and yawing moments are avoided. The rotational directions of the correlated pairs of tube sections 12, 14; 13, 15; and 14, 16 have been indicated in FIGURES 9 and 10 by the arrows thereon.

Referring to second embodiment in FIGS. 11 to 20, the gear mechanism 220 is mounted on the tube section 212 which follows tube 11, the latter being fixed in relation to the propulsion unit 30. The gear mechanism (see FIG. 17) includes gear wheels 221, 222, one of which, preferably the gear wheel 222, has been developed as a step wheel and cooperates with the tooth segment 224 on the succeeding tube section 213, whereas the gear wheel 221 engages the tooth segment 223 of the tube section 11. The tube section 212 may be rotated (as in FIG. 1) by means of motor 70 and chain 71. Herein a second follower gear mechanism 600 is used and carried and comprises (see FIG. 18) gear wheels 604 and 605 which are carried on section 213 and cooperate with tooth segments 124 on section 212, and tooth segment 145 on tube section 214. As in the earlier embodiment, the torque from the tube section 212 is transmitted to the tube section 214, whereby the section 214 revolves with the same speed, but in opposite directions, to section 213 which carries the follower.

Figure 19:
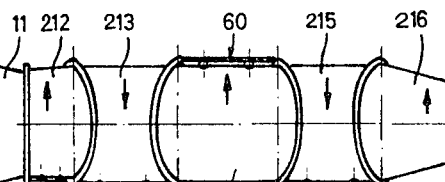
FIGURE 19 is a diagrammatic presentation of a jet nozzle with several tube sections in the position where it is not swung out, and viewed from above.
Figure 20:
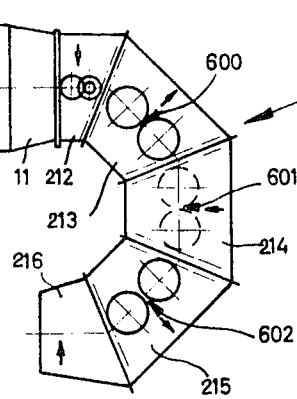
FIGURE 20 is a view corresponding to FIGURE 19, however viewed from the side and swung out so that a thrust reversal of 180° is possible.

When a plurality of sections are used to obtain 180° thrust as in FIGS. 19 and 20, drive mechanisms 601 and 602, similar to drive 600, are mounted on successive tube. The opposite rotation of the successive tubes is shown by the arrows.

The following is claimed:

1. Jet nozzle means of the character described having a plurality of tubular sections, the first section being secured to the propulsion unit at one end and each succeeding section being rotatable about its axis and rotatably connected to the preceding one on an oblique plane, power means for rotating one section, and means for passing torque between first and second sections spaced by an intermediate section comprising an intermeshing follower drive mechanism carried on the intermediate section including intermeshing drive means, the intermeshing means being operably connected to the first and second sections.

2. Jet nozzle means as defined in claim 1 wherein said intermeshing drive means comprises a pair of intermeshing gears, the axis of the gears being perpendicular to the system axis, one of said gears meshing with a rack on the first section and the other gear meshing with a rack on the second section.

3. Jet nozzle means as defined in claim 1 and further including a carriage movable mounted peripherally on the second section; a pair of small connectors reciprocally movable in the carriage and having one end extending therefrom, one connector having its extending end articulated to a bracket on the intermediate section and the other connector having its extending end articulated to a bracket secured to a third section.

4. Jet nozzle means as defined in claim 3 wherein said carriage is mounted for circumferential movement on the second section.

5. Jet nozzle means for a jet airplane having a propulsion unit comprising a first tubular section secured to said propulsion unit at one end, a first plurality of substantially wedge-shaped second tubular sections arranged spaced from each other and pivotable with respect to each other, said second tubular sections being rotatably connected to said first tubular section, a second plurality of substantially wedge-shaped third tubular sections respectively arranged between said spaced second sections and rotatable with respect thereto, said second and third sections being arranged in a first position aligned along a common axis with said first section and with the longer sides of said third sections respectively located between the shorter sides of said second sections, first means connecting said second sections tiltable and non-rotatable with respect to each other, second means connecting said third sections tiltable and non-rotatable with respect to each other, power means engaging one of said second sections for rotating said second sections about their axes, third means on said one second section for rotating said third sections at a speed equal to but in a direction opposite from said second sections, whereby said second and third sections are movable to a second position in which the axes of successive sections are inclined with respect to each other and in which the longer sides of said third sections are respectively located between the longer sides of said second sections.

6. Jet nozzle means as defined in claim 5 wherein said third means comprises a pair of intermeshing gears carried on said one second section, the axis of the gears being perpendicular to the system axis, one of said gears meshing with a rack on said first section and the other gear meshing with a rack on the adjacent third section.

7. Jet nozzle means as defined in claim 6 wherein said first means comprises a carriage movably mounted peripherally on said third sections, a pair of small connectors reciprocally movable in the carriage and having one end extending therefrom, said connectors having their extending ends articulated to a bracket on the adjacent second section.

8. Jet nozzle means as defined in claim 7 wherein said second means comprises a carriage movably mounted peripherally on said second sections, a pair of small connectors reciprocally movable in the carriage and having one end extending therefrom, said connectors having their extending ends articulated to a bracket on the adjacent third section.

9. Jet nozzle means as defined in claim 6 wherein said first means comprises a pair of intermeshing gears carried on said third section, the axis of the gears being perpendicular to the system axis, said gears meshing with a rack on each adjacent second section.

10. Jet nozzle means as defined in claim 9 wherein said second means comprises a pair of intermeshing gears carried on said second sections, the axis of the gears being perpendicular to the system axis, said gears meshing with a rack on each adjacent third section.

References Cited
UNITED STATES PATENTS

| | | | |
|---|---|---|---|
| 3,260,049 | 7/1966 | Johnson | 239—265.35 |
| 3,327,480 | 6/1967 | Gunter | 60—261 |

M. HENSON WOOD, JR., *Primary Examiner.*

MICHAEL Y. MAR, *Assistant Examiner.*

U.S. Cl. X.R.

60—232; 239—588; 244—56; 285—168